US00RE47336E

(19) United States
(12) Reissued Patent
Lee et al.

(10) Patent Number: US RE47,336 E
(45) Date of Reissued Patent: *Apr. 2, 2019

(54) DEVICE FOR MULTI-CORRECTING THE TRAJECTORY

(71) Applicant: DONGIN OPTICAL CO., LTD., Bucheon-si, Gyeonggi-Do (KR)

(72) Inventors: Dong Hee Lee, Seongnam-si (KR); Bo Sun Jeung, Bucheon-si (KR); In Jung, Bucheon-si (KR)

(73) Assignee: DONGIN OPTICAL CO., LTD., Bucheon-si, Gyeonggi-Do (KR)

( * ) Notice: This patent is subject to a terminal disclaimer.

(21) Appl. No.: 15/879,421

(22) Filed: Jan. 24, 2018

Related U.S. Patent Documents

Reissue of:
(64) Patent No.: 8,407,924
Issued: Apr. 2, 2013
Appl. No.: 13/103,389
Filed: May 9, 2011

U.S. Applications:
(60) Continuation of application No. 15/277,370, filed on Sep. 27, 2016, now Pat. No. Re. 46,734, which is a division of application No. 14/669,960, filed on Mar. 26, 2015, now Pat. No. Re. 46,200, which is an application for the reissue of Pat. No. 8,407,924.

(30) Foreign Application Priority Data

Mar. 25, 2011 (KR) ..... 10 2011 0026906

(51) Int. Cl.
*F41G 1/00* (2006.01)
*F41G 1/30* (2006.01)
*F41G 1/473* (2006.01)

(52) U.S. Cl.
CPC ..... *F41G 1/30* (2013.01); *F41G 1/473* (2013.01)

(58) Field of Classification Search
CPC ... F41G 1/30; F41G 1/28; F41G 1/033; F41G 1/20; G02B 23/105; G02B 27/30
See application file for complete search history.

(56) References Cited

U.S. PATENT DOCUMENTS

| | | | | | |
|---|---|---|---|---|---|
| RE14,009 | E | * | 11/1915 | Warner | 42/136 |
| 1,206,060 | A | * | 11/1916 | Warner | 42/136 |
| 2,155,391 | A | * | 4/1939 | Arden | 42/125 |
| 2,345,553 | A | * | 4/1944 | Brown et al. | 42/136 |
| 2,548,031 | A | * | 4/1951 | Leupold | 42/126 |

(Continued)

*Primary Examiner* — Jeffrey R Jastrzab
(74) *Attorney, Agent, or Firm* — Baker McKenzie LLP

(57) ABSTRACT

Disclosed is an apparatus for multi-correcting a trajectory, the apparatus comprising a trajectory correcting unit in which a polygonal cam comprising a plurality of surfaces different in distance from a rotary center is rotatably installed between a dot sight or an optical signal and a firearm to adjust an angle between an optical axis of the dot sight or optical sight and a gun barrel axis of the firearm, wherein the trajectory correcting unit is installed to be movable in an axis direction, and coaxially provided with two or more polygonal cams to respectively set trajectory correcting angles corresponding to distances in accordance with calibers of a bullet and the kinds of bullet. With this, one dot sight or optical sight can be mounted to firearms using bullets different in the trajectory or firearms different in a caliber from one another, thereby enhancing equipment use efficiency.

13 Claims, 11 Drawing Sheets

(56) References Cited

U.S. PATENT DOCUMENTS

| | | | | | |
|---|---|---|---|---|---|
| 2,576,347 | A | * | 11/1951 | Jones | 42/126 |
| 2,774,143 | A | * | 12/1956 | Sunderland | 42/137 |
| 3,414,221 | A | * | 12/1968 | Nelson | 42/126 |
| 3,792,534 | A | * | 2/1974 | Lowe, Jr. | 42/137 |
| 3,882,609 | A | * | 5/1975 | Troutman | 42/124 |
| 4,127,943 | A | * | 12/1978 | Tiritilli | 42/138 |
| 4,317,304 | A | * | 3/1982 | Bass | 42/125 |
| 4,742,636 | A | * | 5/1988 | Swan | 42/126 |
| 6,779,290 | B1 | * | 8/2004 | Houtsma | 42/148 |
| 6,862,832 | B2 | | 3/2005 | Barrett | |
| 7,225,577 | B1 | * | 6/2007 | Wang | 42/124 |
| 7,543,405 | B1 | * | 6/2009 | Ivey | 42/125 |
| 7,647,720 | B1 | * | 1/2010 | Vendetti | 42/126 |
| 8,156,678 | B2 | * | 4/2012 | Hoel et al. | 42/90 |
| 8,240,075 | B1 | * | 8/2012 | Mullin | 42/125 |
| 8,296,991 | B1 | | 10/2012 | Chung | |
| 2006/0010759 | A1 | * | 1/2006 | Penney | 42/126 |
| 2007/0199227 | A1 | * | 8/2007 | Ertl | 42/137 |
| 2008/0202198 | A1 | | 8/2008 | Davidson | |
| 2010/0162611 | A1 | * | 7/2010 | Samson et al. | 42/125 |
| 2011/0154713 | A1 | * | 6/2011 | Jung et al. | 42/137 |

* cited by examiner

DEVICE FOR MULTI-CORRECTING THE TRAJECTORY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue continuation of application Ser. No. 15/277,370, filed Sep. 27, 2016 and issued as U.S. Pat. No. RE46,734, which is a reissue divisional of application Ser. No. 14/669,960, filed Mar. 26, 2015 and issued as U.S. Pat. No. RE 46,200, which is a reissue of U.S. Pat. No. 8,407,924, which* claims priority to and the benefit of Korean Patent Application No. 10-2011-0026906 filed in the Korean Intellectual Property Office on Mar. 25, 2011, the entire contents of *each of* which are incorporated herein by reference.

BACKGROUND OF THE INVENTION (a) Field of the Invention

The present invention relates to an apparatus for multi-correcting a trajectory, and more particularly to an apparatus for multi-correcting a trajectory, in which one dot sight or optical sight can be mounted to firearms using bullets different in the trajectory or firearms different in a caliber from one another, thereby enhancing equipment use efficiency.

(b) Description of the Related Art

Characteristics of a rifle depend on how quickly an aimed shot is possible (speed) and how accurately a target is aimed (accuracy), which is directly related to the aim of the rifle. In general, the aim of the rifle is achieved by aligning a sight and a bead on a line of sight. The aim, based on the alignment between the bead positioned at an end of a gun barrel and the sight positioned on a top of a gun main body, allows a user who uses the firearm to fire accurately in accordance with his/her skill. However, even small vibration or a shake may cause it difficult to adjust the line of sight difficult, and it is disadvantage to do a quick aim required at a short distance or under an urgent situation. In other words, such an aimed-shot method requires complicated procedures and time in catching and checking a target, adjusting the line of sight, aiming, etc. Further, the bead and the sight are so small that they can be susceptible to a small shake when being accurately aligned. Also, if too much attention is paid to adjustment of the line of sight, a user' eyes are riveted to the bead and the sight rather than the target or the front, and thus have a narrow view.

To more enhance accuracy without difficulty in adjusting the fine of sight, an optical sight has been proposed. However, the optical sight employs a telescopic lens and is thus more susceptible to a small shake as magnification becomes higher, thereby making the quick aim impossible.

To solve the above problem, the optical sight employs a no-magnification lens (or a low-magnification lens), and there has been proposed a dot sight using an aiming point instead of the complicated line of sight.

The optical dot sight is simple and makes the quick aim possible, so that it can be advantageously very useful at a short distance or under an urgent situation requiring a prompt reaction. That is, it takes little time to adjust the line of sight, the quick aim is achieved by marking a target with a virtual image of a dot light point, and a clear view is also very effectively secured. Accordingly, there is advantage of minimizing not only the time taken in the aiming, but also an aiming-based obstacle to the view and situation checking.

As shown in FIG. 1, such an optical dot sight includes an inner body tube aligning adjusting terminal 7 placed above a sight mirror housing 2 having a cylindrical structure, a fastening grill 26 detachably coupled to a rifle sight bundle in the form of a railway below the sight mirror housing 2. Further, the optical dot sight includes a protective window 10 at a housing front end, a light emitting diode (LED) 8 used as a light source at a predetermined position above the inner body tube of the housing 2, and a reflective mirror 9 having a certain curvature and placed behind the protective window 10 inside the housing 2.

Generally, the reflective mirror 9 allows an observer's (user's) eyes to see the front end of the dot sight 1, and is coated to reflect a light beam emitted from a light point of the LED 8 and having a wavelength of about 650 nm. Further, the front and rear spherical surfaces of the reflective mirror 9 have the same curvature.

That is, the reflector 9 allows the observer's (user's) eyes to see the front end of the dot sight 1, and reflects the light beam emitted from the light point of the LED 8 and having the wavelength of about 650 nm. The observer (user) fires when a target is marked with the virtual image of the dot light point from the LED 9. Thus, the aim can be easily achieved.

In theory, light beams emitted from a point light source (light point) formed by the LED 8 placed inside the optical dot sight 1 and a mask or reticle placed in front of the LED 8 are reflected from the reflective mirror 9 and intended to parallel enter the observer's eyes. This parallelism is intended to be aligned with a bullet firing axis of the gun barrel. However, if the parallelism of the dot sight 1 is not aligned with the bullet firing axis of the gun barrel, a target cannot be hit even though an observer marks the target with a virtual dot image of the light beam from the LED 8. Therefore, in order to align the parallelism of the dot sight 1 with the bullet firing axis of the gun barrel, there is provided the inner body tube aligning adjusting terminal 7 having vertical and horizontal adjusting functions, thereby aligning an optical axis of the inner body tube with the bullet firing axis.

Also, the foregoing conventional optical dot sight is provided with a trajectory correcting unit for correcting a trajectory. Such a trajectory correcting unit is customized and manufactured in accordance with the kinds of bullet such as a general bullet, an armor-piercing bomb, an incendiary bomb, an armor-piercing incendiary bomb, etc. or in accordance with the calibers of the firearms. Therefore, there arises a problem that different trajectory correcting units are respectively installed in the firearms using bullets different in the trajectory or the firearms different in the caliber. For example, as shown in FIG. 2, a bullet having a trajectory A and a bullet having a trajectory B are different in a trajectory curve in accordance with their calibers, and therefore a machine gun having the trajectory A or a machine gun having the trajectory B are provided with dot sights or optical sights, respectively. Further, the dot sights or the optical sights are respectively provided with the trajectory correcting units corresponding to their calibers.

For example, the bullet having the trajectory A has an error of 4.5 mm between the trajectory curve and the optical axis of the dot sight or optical sight at a distance of 300 m, and an error of 5.8 mm at a distance of 1200 m. Likewise, the bullet having the trajectory B has an error of 3.9 mm at a distance of 300 m, and an error of 4.7 mm at a distance of 1200 m.

Thus, the dot sights or the optical sights installed in the machine gun having the trajectory A and the machine gun having the trajectory B are respectively provided with the trajectory correcting units for adjusting a trajectory correction angle between the bullet firing axis and the optical axis of the dot sight or optical sight with respect to the trajectory curve according to distances. Since such dot sights or optical sights are respectively customized for the machine guns in accordance with their calibers, it can be applied to only the firearm having the corresponding caliber, thereby lowering equipment using efficiency.

SUMMARY OF THE INVENTION

Accordingly, the present invention is conceived to solve the forgoing problems, and an aspect of the present invention is to provide an apparatus for multi-correcting a trajectory, in which one dot sight or optical sight can be mounted to firearms using bullets different in the trajectory or firearms different in a caliber from one another, thereby enhancing equipment use efficiency.

Another aspect of the present invention is to provide an apparatus for multi-correcting a trajectory, in which a position of a rotary shaft can be prevented from being arbitrarily changed in the state that polygonal cams plurally formed in one rotary shaft are selected.

Still another aspect of the present invention is to provide an apparatus for multi-correcting a trajectory, in which the rotary shaft can be replaced to be easily applied and mounted to a firearm having an unprecedented new caliber.

An exemplary embodiment of the present invention provides an apparatus for multi-correcting a trajectory, the apparatus comprising a trajectory correcting unit in which a polygonal cam comprising a plurality of surfaces different in distance from a rotary center is rotatably installed between a dot sight or an optical signal and a firearm to adjust an angle between an optical axis of the dot sight or optical sight and a gun barrel axis of the firearm, wherein the trajectory correcting unit is installed to be movable in an axis direction, and coaxially provided with two or more polygonal cams to respectively set trajectory correcting angles corresponding to distances in accordance with calibers of a bullet and the kinds of bullet.

The apparatus may further comprise a gun barrel supporter formed with a through hole, in which the trajectory correcting unit is installed, and fastened to a firearm; and a base formed with a contact unit to contact one of the two or more polygonal cams, rotatably installed in the gun barrel supporter, and installed with the dot sight or the optical sight.

The trajectory correcting unit may limit an axial moving range by protrusions respectively placed at opposite end parts of an axial moving region and interfering with vicinity of the through hole.

The apparatus may further comprise a stopper that is coupled to one end part of the opposite end parts of the trajectory correcting unit selectively exposed to an outside of the gun barrel supporter and holds an axial moving position of the trajectory correcting unit.

The trajectory correcting unit may be formed with ring-shaped insertion grooves at opposite end parts, respectively, in which an end part of the stopper is inserted.

The stopper may comprise a first projection formed at one side of an end part of the trajectory correcting unit to be inserted in the ring-shaped insertion groove, and the trajectory correcting unit comprises a second projection formed at one side of an inner circumference of the ring-shaped insertion groove and limiting a rotating radius of the first projection so that a rotary angle of the trajectory correcting unit can be limited.

In the two or more polygonal cams of the trajectory correcting unit, one surface among the plurality of surfaces may be configured to have the same level as a surface of an adjacent polygonal cam.

*In an example, an apparatus for correcting a trajectory includes a trajectory correcting unit disposed between a sight and a firearm to adjust an angle between an optical axis of the sight and a barrel axis of the firearm. The trajectory correcting unit includes a first adjustor operable to select a bullet caliber and a second adjustor operable to select a distance. The trajectory correcting unit is operable to select an angle between the sight and the barrel axis of the firearm based on the bullet caliber selected by the first adjustor or the distance selected by the second adjustor.*

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
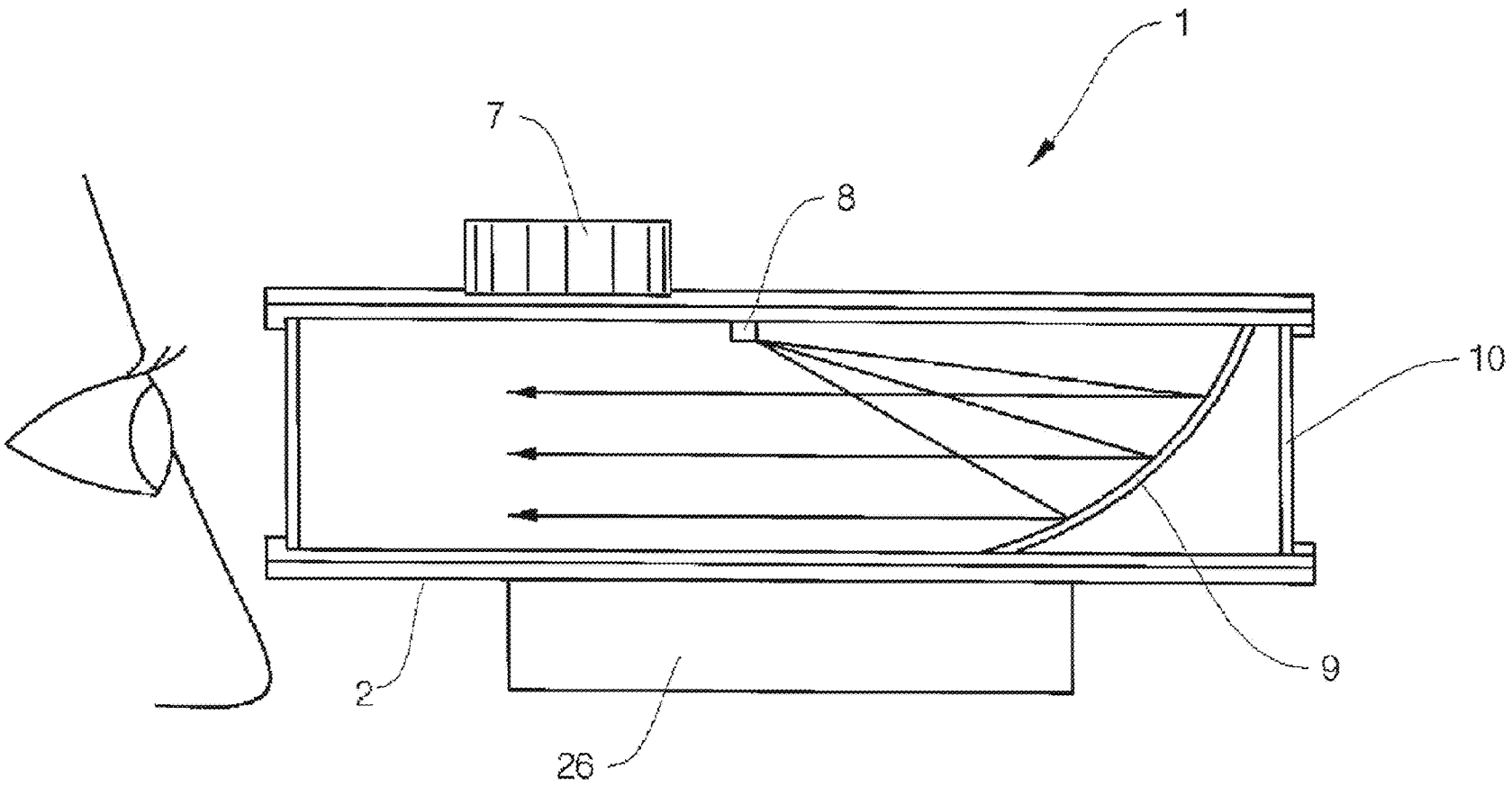
FIG. 1 is a view schematically showing an inner configuration of a general dot sight.
Figure 2:
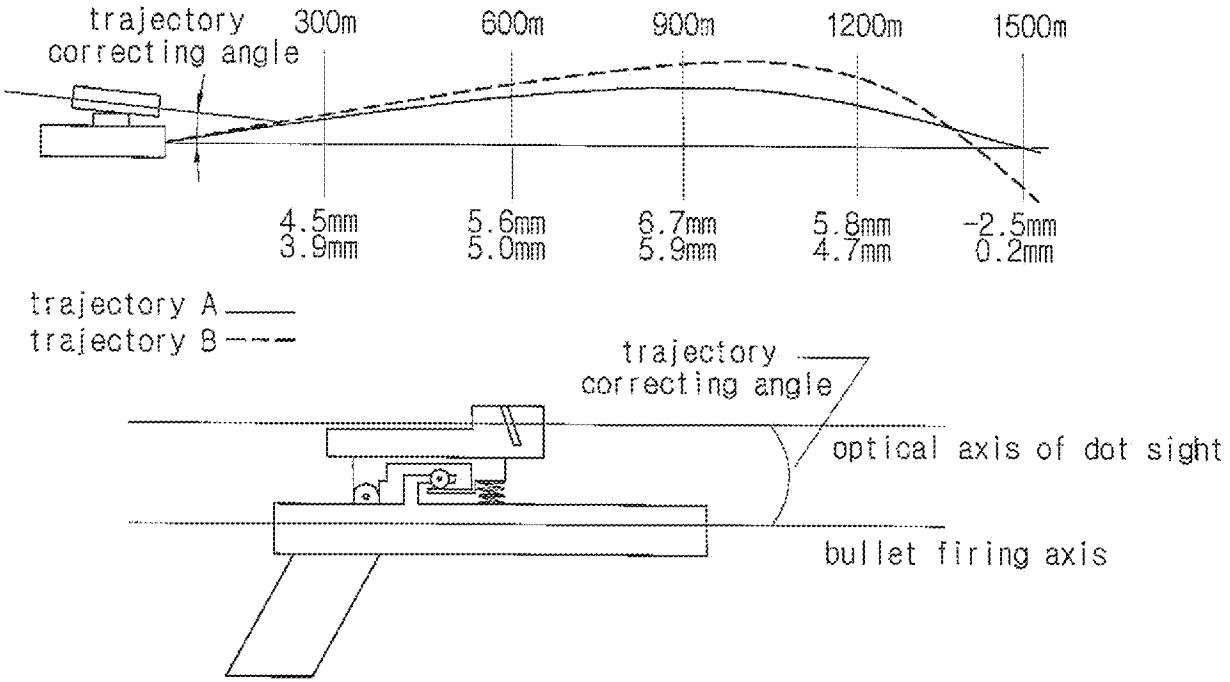
FIG. 2 shows trajectory curves of bullets different in kinds from each other.

Prior to description, a first exemplary embodiment among many exemplary embodiments will representatively explain elements, and other exemplary embodiments will describe only different elements from those of the first exemplary embodiment, in which like reference numerals refer to like elements throughout the embodiments.

Hereinafter, an apparatus for multi-correcting a trajectory according to an exemplary embodiment of the present invention will be described with reference to the accompanying drawings.

Figure 3:
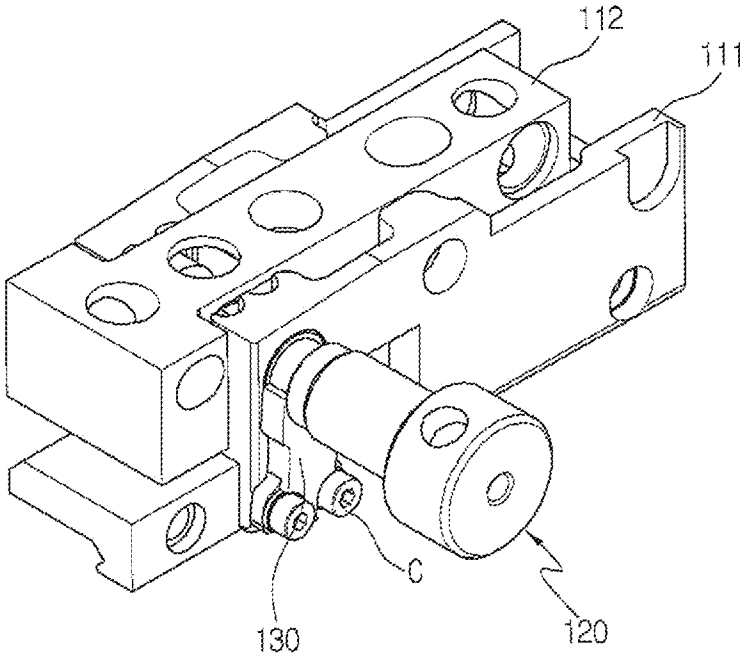
FIG. 3 is a perspective view of an apparatus for multi-correcting a trajectory according to an exemplary embodiment of the present invention.
Figure 4:
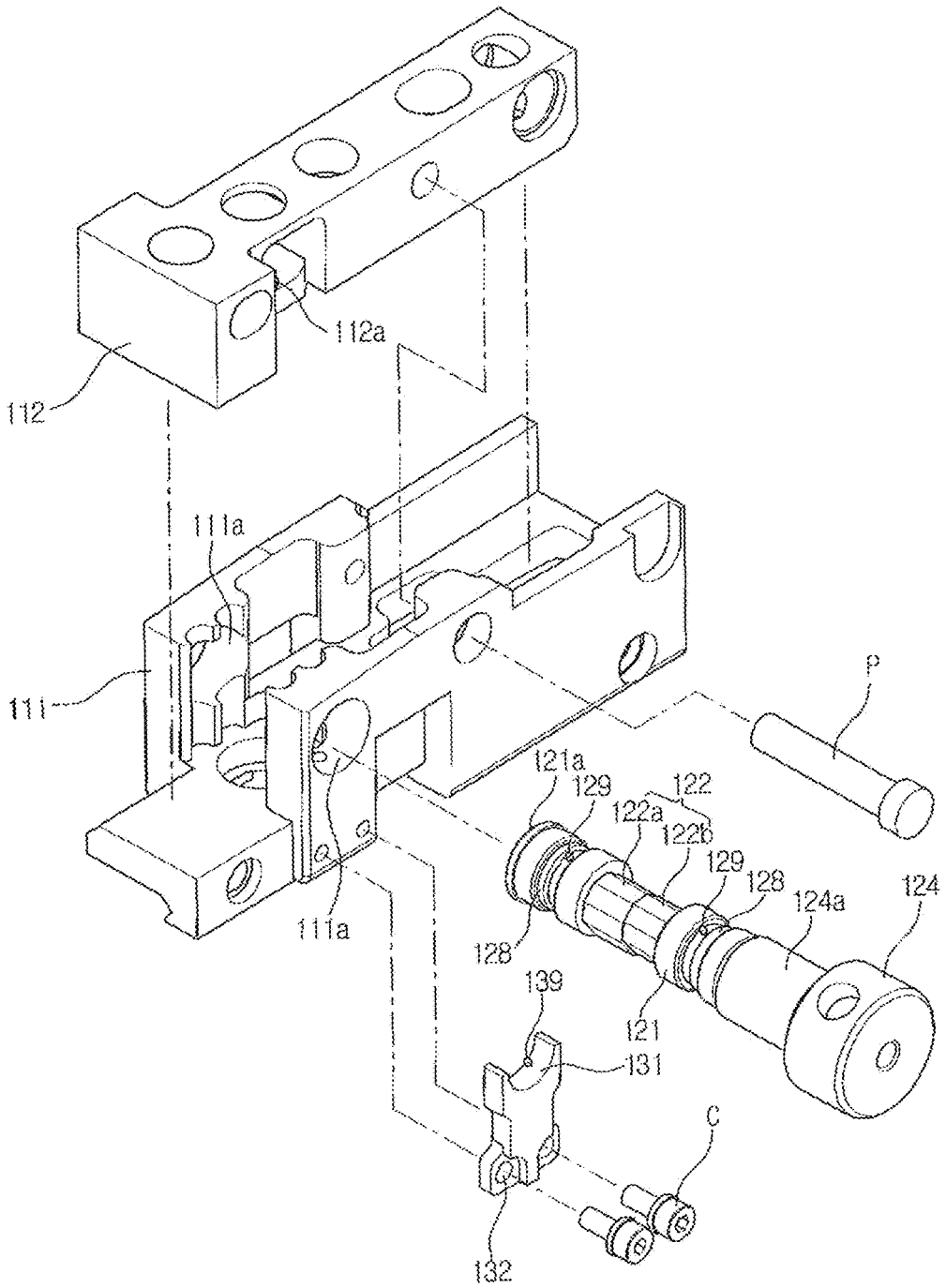
FIG. 4 is an exploded perspective view of an apparatus for multi-correcting a trajectory according to an exemplary embodiment of the present invention.

Among the accompanying drawings, FIG. 3 is a perspective view of an apparatus for multi-correcting a trajectory according to an exemplary embodiment of the present invention, and FIG. 4 is an exploded perspective view of an apparatus for multi-correcting a trajectory according to an exemplary embodiment of the present invention.

As shown therein, an apparatus for multi-correcting a trajectory according to an exemplary embodiment of the present invention includes a trajectory correcting unit 120 and a stopper 130.

Further, the apparatus for multi-correcting the trajectory includes a gun barrel supporter 111 formed with a through hole 111a, to which the trajectory correcting unit 120 is installed, and installed to a firearm; and a base 112 formed with a contact unit 112a contacting one of two or more polygonal cams 122 of the trajectory correcting unit 120, rotatably installed at the gun barrel supporter 111 and to which a dot sight or optical sight is installed.

The trajectory correcting unit 120 is rotatably installed between the dot sight or optical sight and the firearm so as to adjust an angle between an optical axis of the dot sight or optical sight and a gun barrel axis of the firearm in accordance with distances from a target, and aligns a trajectory curve with an optical axis of the dot sight or optical sight in accordance with the distances from the target. Further, the trajectory correcting unit 120 includes two or more polygonal cams 122, which have a plurality of surfaces different in distance from a rotary center, along an axial direction; a rotary shaft 121 coupled to a through hole 111a of the gun barrel supporter 111 movably along the axial direction; and a grip 124 detachably coupled to one end part of the rotary shaft 121.

Also, the trajectory correcting unit 120 is provided with protrusions 121a and 124a at opposite end parts of an axial moving region of the rotary shaft 121 and limits the axial moving region as interfering with the vicinity of the through hole 111a, in which one protrusion 124a is provided at a side of the grip 124 and the other protrusion 121a is provided the other end part of the rotary shaft 121. Also, a ring-shaped insertion groove 128 is formed in an inside region of the opposite protrusions 121a and 124a, and a second projection 129 is formed at one side of an inner circumference of the ring-shaped insertion groove 128.

Meanwhile, the polygonal cam 122 has a plurality of surfaces on the outer circumference thereof, respective surfaces of which are set to have different distances from the rotary center of the rotary shaft 121. In this exemplary embodiment, it will be described under the condition that the two or more polygonal cams 122 formed on the rotary shaft 121 include a first polygonal cam 122a for correcting a trajectory of a bullet having a trajectory B, and a second polygonal cam 122b for correcting a trajectory of a bullet having a trajectory A. The first polygonal cam 122a and the second polygonal cam 122b are set up to have respective surfaces for correcting the trajectory of the bullet in accordance with preset distances.

Also, in the state that each one of the plural surfaces constituting the first polygonal cam 122a and second polygonal cam 122b is set up as a reference surface, and respective surfaces of the first polygonal cam 122a and the second polygonal cam 122b are disposed in parallel with each other, a setup height of each reference surface, i.e., a height from the rotary center of the rotary shaft 121 to the reference surface is set up at the same level. Thus, in the state that one reference surface of the first polygonal cam 122a and the second polygonal cam 122b is selected, the reference surface of the adjacent polygonal cam is formed on the same level, so that move between the first polygonal cam 122a and the second polygonal cam 122b can be easily achieved (refer to FIG. 7).

The stopper 130 is detachably coupled to the ring-shaped insertion groove 128 of one end part exposed to the outside of the gun barrel supporter 111 between the opposite end parts of the trajectory correcting unit 120, and prevents the trajectory correcting unit 120 from moving in an axial direction. The stopper 130 has one end part in which a semicircular insertion groove 131 to be inserted in the ring-shaped insertion groove 128 is formed, and the other end part in which a through hole 132 is formed, so that it can be fastened to the gun barrel supporter 111 by a fastener C such as a screw or the like via the through hole 132.

Meanwhile, the ring-shaped insertion groove 128 of the trajectory correcting unit 120 and the semicircular insertion groove 131 of the stopper 130 are respectively formed with a first projection 139 and the second projection 129 for limiting the rotary angle of the trajectory correcting unit 120. Specifically, If trajectory correcting angles provided by the trajectory correcting unit 120 are set to shooting distances of 200 m, 400 m, 600 m, 800 m, 1000 m and 2000 m, respectively, there is a great difference in between the trajectory correcting angle at the distance of 200 m and the trajectory correcting angle at the distance of 2000 m. Therefore, if the second projection 129 of the trajectory correcting unit 120 and the first projection 139 of the stopper 130 interfere with each other between the distances of 200 m and 2000 m, it is possible to prevent the trajectory correcting unit 120 from being arbitrarily rotated and changed in a setting position between the distances 200 m and 2000 m.

Below, an operation of the foregoing apparatus for multi-correcting the trajectory according to a first exemplary embodiment of the present invention will be described.

Figure 5:
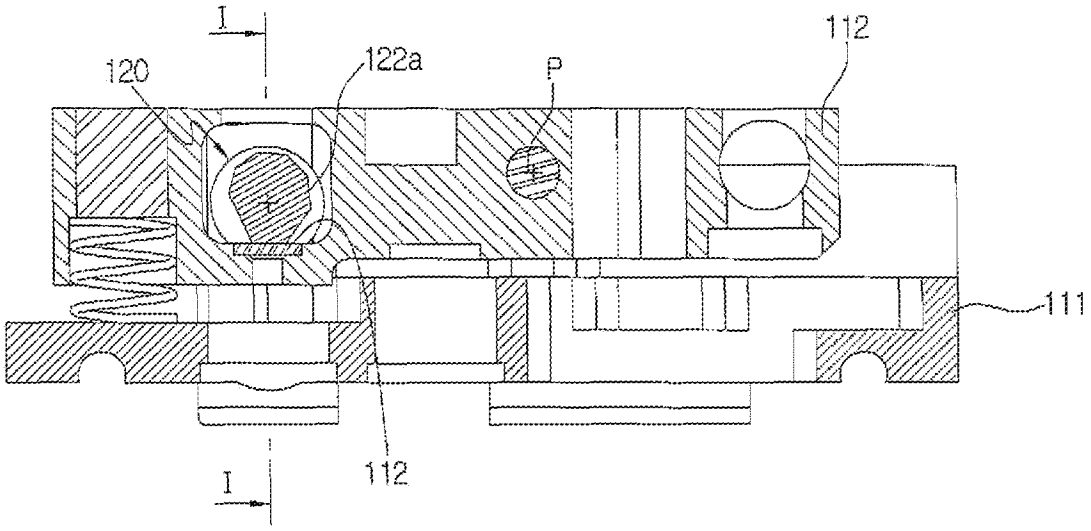
FIG. 5 is a lateral cross-section view of an apparatus for multi-correcting a trajectory according to an exemplary embodiment of the present invention.
Figure 6:
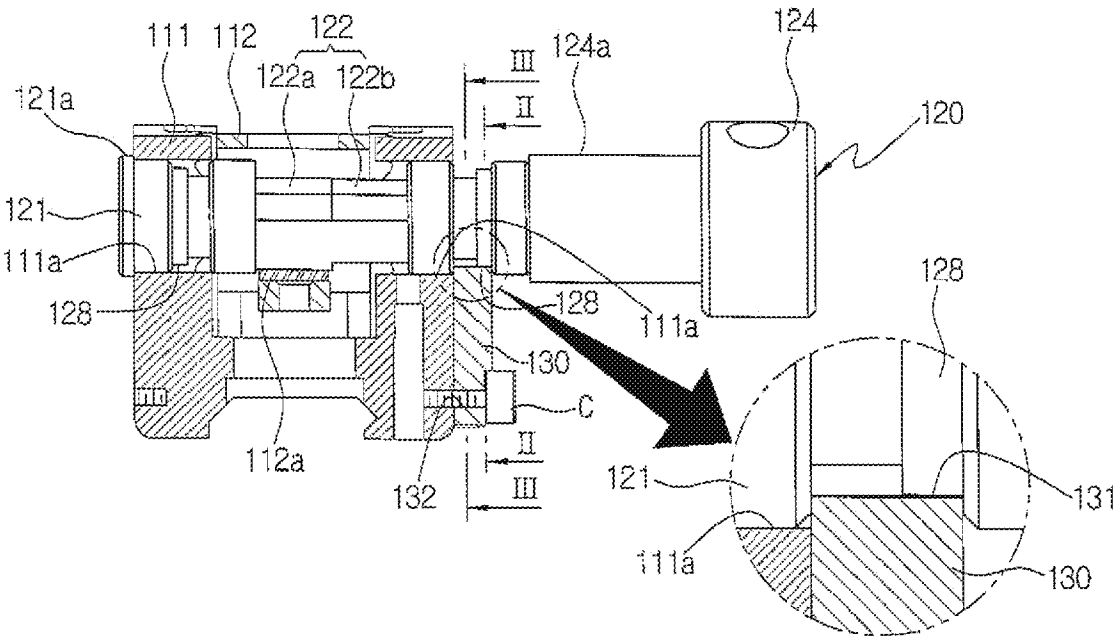
FIG. 6 is a cross-section view taken along line I-I of FIG. 5.
Figure 7:
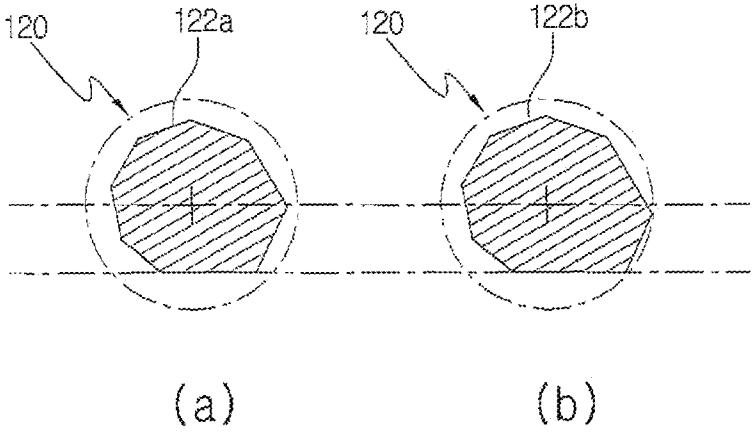
FIG. 7 is a cross-section view of a first polygonal cam and a second polygonal cam in an apparatus for multi-correcting a trajectory according to an exemplary embodiment of the present invention.
Figure 8:
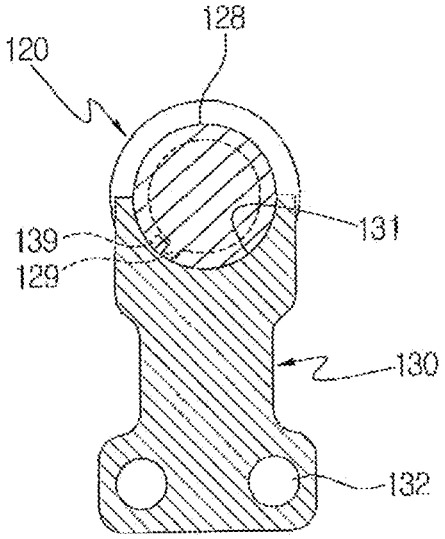
FIG. 8 is a cross-section view taken along line of FIG. 6.
Figure 9:
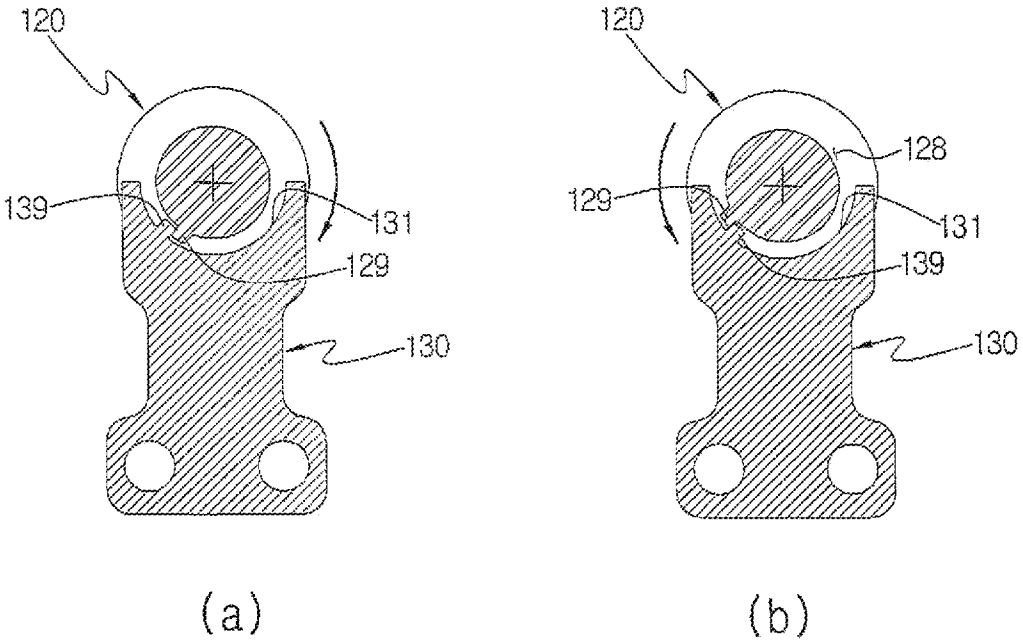
FIG. 9 is an operational view of a cross-section taken along line III-III of FIG. 6.

Among the accompanying drawings, FIG. 5 is a lateral cross-section view of an apparatus for multi-correcting a trajectory according to an exemplary embodiment of the present invention, FIG. 6 is a cross-section view taken along line I-I of FIG. 5, FIG. 7 is a cross-section view of a first polygonal cam and a second polygonal cam in an apparatus for multi-correcting a trajectory according to an exemplary embodiment of the present invention, FIG. 8 is a cross-section view taken along line II-II of FIG. 6, and FIG. 9 is an operational view of a cross-section taken along line III-III of FIG. 6.

First, as shown in FIGS. 5 and 6, the apparatus for multi-correcting the trajectory according to an exemplary embodiment of the present invention in the state that the gun barrel supporter 111 is fastened to the firearm, and the base 112 installed with the dot sight or the optical sight is rotatably installed in the gun barrel supporter 111, the polygonal cam 122 of the trajectory correcting unit 120 rotatably coupled to the gun barrel supporter 111 contacts the contact unit 112a of the base 112 and keep a space between the gun barrel supporter 111 and the base 112. Thus, the polygonal cam 122 of the trajectory correcting unit 120 rotates to change the distance between the surface of the polygonal cam 122 contacting the contact unit 112a and the rotary center of the trajectory correcting unit 120, so that the trajectory can be conveniently corrected in accordance with the distances frons the target. At this time, an elastic member is provided between the gun barrel supporter 111 and the base 112 in order to elastically supporting the base 112 in one direction.

The rotary shaft 121 of the trajectory correcting unit 120 is coaxially provided with the first polygonal cam 122a and the second polygonal cam 122b different in adjustment height according to the calibers and the kinds of bullet, so that one of the first polygonal cam 122a and the second polygonal cam 122b can be selected by moving the rotary shaft 121 in a lengthwise direction, thereby allowing the trajectory to be corrected with regard to the bullets different in caliber from one another through the single trajectory correcting unit 120.

That is, as shown therein, in the state that the rotary shaft 121 of the trajectory correcting unit 120 is moved rightward, the first polygonal cam 122a formed on the rotary shaft 121 is disposed at a position corresponding to the contact unit 112. In this state, the plurality of surfaces constituting the first polygonal cam 122a respectively contact the contact unit 112a by gripping anti rotating the grip 124 fixed to one end of the rotary shaft 121, so that the angle between the gun barrel supporter 111 and the base 112 can be adjusted to thereby correct the trajectory of the bullet having the trajectory B in accordance with the distances from the target.

At this time, the protrusion 121a formed on the other end part of the rotary shaft 121 interferes with the vicinity of the through hole 111a at the other side of the gun barrel supporter 111, and limits rightward movement of the rotary shaft 121. Further, the semicircular insertion groove 131 of the stopper 130 is inserted in the ring-shaped groove 128 of the rotary shaft 121 exposed to the outside of the through hole 111a at one side of the gun barrel supporter 111 by moving the rotary shaft 121 rightward, so that the rightward movement of the rotary shaft 121 can be limited. That is, a user moves the rotary shaft 121 rightward in order to select the first polygonal cam 122a in the state that the stopper 130 is separated, and then fastens the stopper 130 to the ring-shaped insertion groove 128 of the rotary shaft 121 exposed to the outside of the through hole 111a at one side, thereby interposing the stopper 130 between the protrusion 124a of the grip 124 and the through hole 111a at one side.

Meanwhile, the stopper 130 is fixed as a fastening member C penetrates a through hole 132 formed at an opposite end part of the semiconductor insertion groove 131 and is fastened to the gun barrel supporter 111.

As shown in FIG. 7, the trajectory correcting unit 120 is configured so that one of the plural surfaces constituting the first polygonal cam 122a and the second polygonal cam 122b can have the same level as the surface of the adjacent polygonal cam.

That is, the first polygonal cam 122a and the second polygonal cam 122b have a plurality of surfaces different in distance from the rotary center of the trajectory correcting unit 120, If one surface of the first polygonal cam 122a and one surface of the second polygonal cam 122b among such the plurality of surfaces are configured at the same distance and set as the reference surfaces, movement between the first polygonal cam 122a and the second polygonal cam 122b can be easily performed in the state that the reference surface and the contact unit of the base are in contact with each other.

If a surface other than the reference surface is selected, a height difference is generated between the selected surface and the surface of the adjacent polygonal cam. Such a height difference makes it difficult to move between the first polygonal cam 122a and the second polygonal cam 122b. Therefore, as described above, in the state that the reference surface is in contact with the contact unit 112a, the first polygonal cam 122a and the second polygonal cam 122 can be selected while removing the stopper 130 and moving the trajectory correcting unit 120 at opposite lateral directions.

Further, as shown in FIGS. 8 and 9, the second protrusion 129 formed on the outer circumference of the ring-shaped insertion groove 128 of the trajectory correcting unit 120 is configured to interfere with the first protrusion 139 formed on the inner circumference of the semicircular insertion groove 131 of the stopper 130, so that the trajectory correcting unit 120 can be prevented from being rotated through 360 degrees in the state that the semicircular insertion groove 131 of the stopper 130 is coupled to the ring-shaped insertion groove 128 of the trajectory correcting unit 120.

In particular, the first protrusion 139 and the second protrusion 129 interfere with each other between the distances of 200 m and 2000 m, in which the difference of the trajectory correcting angle is the greatest, so that a trajectory correcting value can be prevented from being suddenly changed by an external shock, a control error, etc.

That is, if a setting position of the trajectory correcting unit 120 is arbitrarily changed, there is no great difference in the trajectory correcting value even through the trajectory is arbitrarily corrected within a section where the trajectory correcting value is small like a section between 200 m and 400 m or a section between 1000 m and 2000 m, so that the bullet can hit an adjacent position to the target. On the other hand, in the case of a section between 200 m and 2000 m, there is a great difference in the trajectory correcting value. Thus, if the trajectory correcting angle for 2000 m is applied to a target located at a distance of 200 m, a hitting position completely gets out of the target. Therefore, the first protrusion 139 and the second protrusion 129 are placed between the distances of 200 m and 2000 m, in which the difference of the trajectory correcting angle is the greatest.

Figure 10:
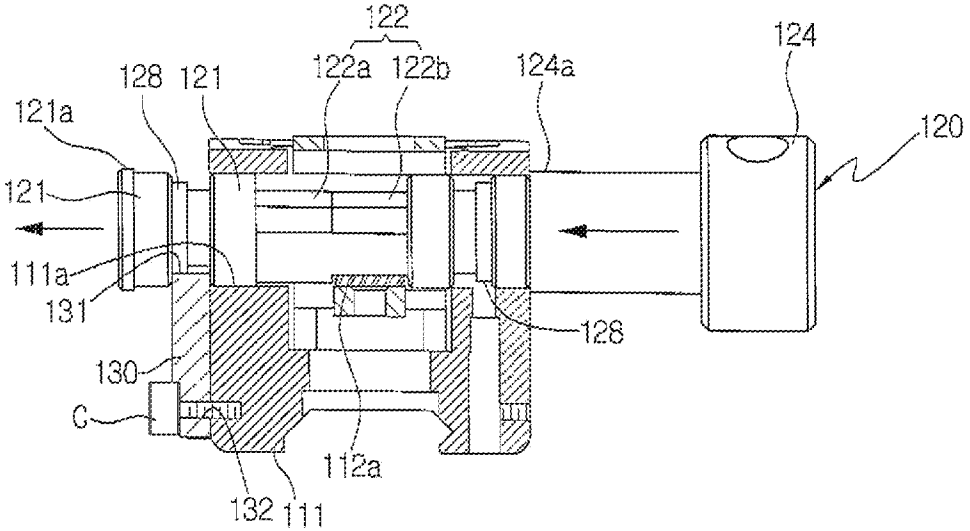
FIG. 10 is an operational cross-section view of an apparatus for multi-correcting a trajectory according to an exemplary embodiment of the present invention.

FIG. 10 is an operational cross-section view of an apparatus for multi-correcting a trajectory according to an exemplary embodiment of the present invention.

Referring to FIG. 10, before moving the trajectory correcting unit 120 [rightward] *leftward*, the stopper 130 is separated from the ring-shaped insertion groove 128 placed at a right side of the trajectory correcting unit 120 of FIG. 6, and then the rotary shaft 121 of the trajectory correcting unit 120 is moved [rightward] *leftward* as shown in FIG. 10 so that the second polygonal cam 122b formed on the rotary shaft 121 can be placed at a position corresponding to the contact unit 112a of the base 112. Further, the stopper 130 is coupled again to the ring-shaped insertion groove 128 placed at a left side of the trajectory correcting unit 120 exposed to the outside of the gun barrel supporter 111, and thus the position of the trajectory correcting unit 120 is set.

In the state that the position of the trajectory correcting unit 120 is set as described above, if the rotary shaft 121 is rotated while gripping the grip 124, the angle between the gun barrel supporter 111 and the base 112 is adjusted by the second polygonal cam 122b to thereby correct the trajectory of the bullet having the trajectory A.

Although the same level reference surfaces of the first polygonal cam 122a and the second polygonal cam 122b are illustrated as seen on the front, the same level reference surfaces of the first polygonal cam 122a and the second polygonal cam 122b are in contact with the contact unit 112a while movement is performed between the first polygonal cam 122a and the second polygonal cam 122b as described above.

Figure 11:
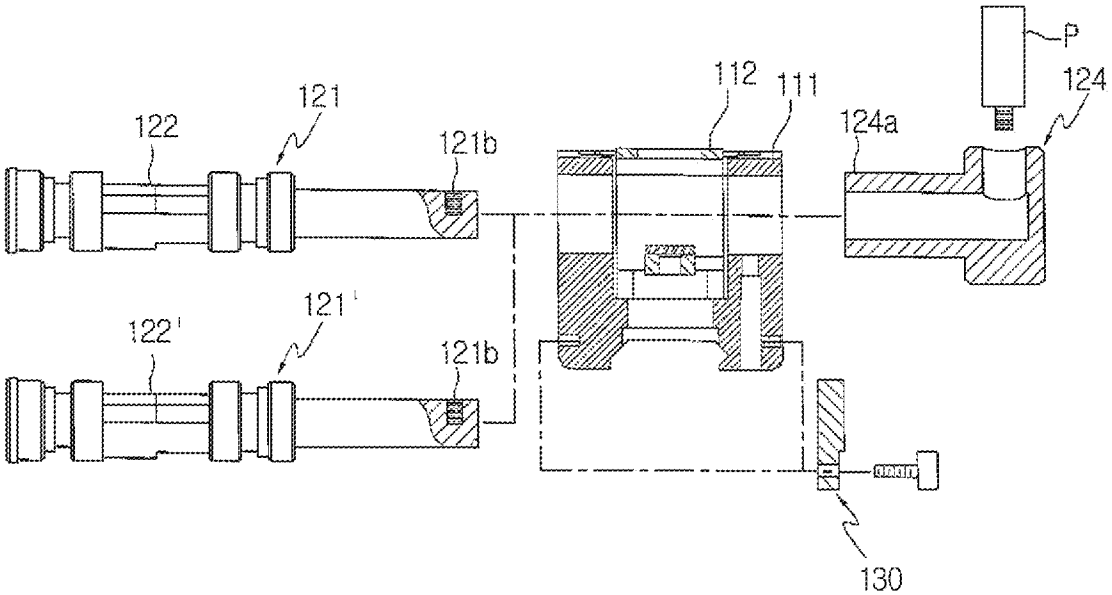
FIG. 11 is a cross-section view showing that a rotary shaft is replaced in an apparatus for multi-correcting a trajectory according to an exemplary embodiment of the present invention.

FIG. 11 is a cross-section view showing that a rotary shaft 121, 121' is replaced in an apparatus for multi-correcting a trajectory according to an exemplary embodiment of the present invention.

As shown in FIG. 11, in the trajectory correcting unit 120 according to an exemplary embodiment of the present invention, since the rotary shaft 121 and the grip 124 are detachably assembled, it is possible to separate the rotary shaft 121 from the through hole 111a of the gun barrel supporter 111 in the state that the grip 124 is separated from the rotary shaft 121.

That is, in the state that the rotary shaft 121 is inserted in the through hole 111a of the gun barrel supporter 111, the grip 124 is detachably coupled to one end part of the rotary shaft 121. The grip 124 is separated from the rotary shaft 121, and then the rotary shaft 121 is pushed rightward in FIG. 11 and separated from the gun barrel supporter 111. Then, other rotary shafts 121' respectively formed with polygonal cams 122' for correcting the trajectory with regard to a bullet having a trajectory C or a bullet having a trajectory D different from the trajectory A or the trajectory B are inserted into the through hole 111a of the gun barrel supporter 111, and then the grip 124 is assembled, thereby being applicable to a firearm for a bullet having a different caliber.

Accordingly, in the apparatus for multi-correcting a trajectory according to an exemplary embodiment of the present invention, the rotary shaft formed with the polygonal cam 122 for correcting the trajectory corresponding to the caliber of the bullet of the firearm in which the dot sight or the optical sight is installed can be coupled and used to the gun barrel supporter 111, or the rotary shaft 121 can be moved leftward or the rightward for correcting the trajectory corresponding to the caliber, thereby enhancing equipment use efficiency.

Meanwhile, as shown in FIG. 11, the grip 124 detachably coupled to the rotary shaft 121 is assembled as a rod p penetrating the grip 124 is fastened to a fastening hole 121b formed at one end part of the rotary shaft 121 in the state that the grip 124 is assembled to surround one end part of the rotary shaft 121.

As apparent from the above description, there is provided an apparatus for multi-correcting a trajectory, in which one dot sight or optical sight can be mounted to firearms using bullets different in the trajectory or firearms different in a caliber from one another, thereby enhancing equipment use efficiency.

Also, there is provided an apparatus for multi-correcting a trajectory, in which a position of a rotary shaft can be prevented from being arbitrarily changed in the state that polygonal cams plurally formed in one rotary shaft are selected.

Further, there is provided an apparatus for multi-correcting a trajectory, in which the rotary shaft can be replaced to be easily applied and mounted to a firearm having an unprecedented new caliber.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

[1. An apparatus for multi-correcting a trajectory, the apparatus comprising a trajectory correcting unit in which a polygonal cam comprising a plurality of surfaces different in distance from a rotary center is rotatably installed between a dot sight or an optical signal and a firearm to adjust an angle between an optical axis of the dot sight or optical sight and a gun barrel axis of the firearm, wherein the trajectory correcting unit is installed to be movable in an axis direction, and coaxially provided with two or more polygonal cams to respectively set trajectory correcting angles corresponding to distances in accordance with calibers of a bullet and the kinds of bullet.]

[2. The apparatus according to claim 1, further comprising a gun barrel supporter formed with a through hole, in which the trajectory correcting unit is installed, and fastened to a firearm; and a base formed with a contact unit to contact one of the two or more polygonal cams, rotatably installed in the gun barrel supporter, and installed with the dot sight or the optical sight.]

[3. The apparatus according to claim 2, wherein the trajectory correcting unit limits an axial moving range by protrusions respectively placed at opposite end parts of an axial moving region and interfering with vicinity of the through hole.]

[4. The apparatus according to claim 2, further comprising a stopper that is coupled to one end part of the opposite end parts of the trajectory correcting unit selectively exposed to an outside of the gun barrel supporter and holds an axial moving position of the trajectory correcting unit.]

[5. The apparatus according to claim 4, wherein the trajectory correcting unit is formed with ring-shaped insertion grooves at opposite end parts, respectively, in which an end part of the stopper is inserted.]

[6. The apparatus according to claim 5, wherein the stopper comprises a first projection formed at one side of an end part of the trajectory correcting unit to be inserted in the ring-shaped insertion groove, and the trajectory correcting unit comprises a second projection formed at one side of an inner circumference of the ring-shaped insertion groove and limiting a rotating radius of the first projection so that a rotary angle of the trajectory correcting unit can be limited.]

[7. The apparatus according to claim 1, wherein in the two or more polygonal cams of the trajectory correcting unit, one surface among the plurality of surfaces is configured to have the same level as a surface of an adjacent polygonal cam.]

[8. The apparatus according to claim 2, wherein the two or more polygonal cams of the trajectory correcting unit, one surface among the plurality of surfaces is configured to have the same level as a surface of an adjacent polygonal cam.]

[9. The apparatus according to claim 3, wherein the two or more polygonal cams of the trajectory correcting unit, one surface among the plurality of surfaces is configured to have the same level as a surface of an adjacent polygonal cam.]

[10. The apparatus according to claim 4, wherein the two or more polygonal cams of the trajectory correcting unit, one surface among the plurality of surfaces is configured to have the same level as a surface of an adjacent polygonal cam.]

[11. The apparatus according to claim 5, wherein the two or more polygonal cams of the trajectory correcting unit, one surface among the plurality of surfaces is configured to have the same level as a surface of an adjacent polygonal cam.]

[12. The apparatus according to claim 6, wherein the two or more polygonal cams of the trajectory correcting unit, one surface among the plurality of surfaces is configured to have the same level as a surface of an adjacent polygonal cam.]

*13. An apparatus for correcting a trajectory, comprising:*

*a base;*

*a supporter configured to couple to a firearm and distinct from the base;*

*a spring disposed between the base and the supporter;*

*a first removable member including a first plurality of surface areas and configured to couple with the base;*

*a second removable member including a second plurality of surface areas and configured to couple with the base;*

*a contacting member configured to select an angle between the base and the supporter; and*

*a pin that couples the base and the supporter, the pin being disposed between the spring and the contacting member with respect to a longitudinal axis of the base, wherein*

*the contacting member is configured to respectively contact the first plurality of surfaces areas of the first removable member to provide a first set of angle selections when the first removable member is coupled with the base,*

*the contacting member is configured to respectively contact the second plurality of surfaces areas of the second removable member to provide a second set of angle selections when the second removable member is coupled with the base, and*

*the first set of angle selections is different than the second set of angle selections.*

*14. An apparatus for correcting a trajectory, comprising:*

*a base;*

*a supporter configured to couple to a firearm and distinct from the base;*

*a pin that couples the base and the supporter;*

*a first removable member including a first plurality of surface areas and configured to couple with the base;*

*a second removable member including a second plurality of surface areas and configured to couple with the base; and*

*a contacting member configured to select an angle between the base and the supporter, wherein*

*the contacting member is configured to respectively contact the first plurality of surfaces areas of the first removable member to provide a first set of angle selections when the first removable member is coupled with the base,*

*the contacting member is configured to respectively contact the second plurality of surfaces areas of the second removable member to provide a second set of angle selections when the second removable member is coupled with the base,*

*the first set of angle selections is different than the second set of angle selections,*

*the base includes a space defined therein, and*

*the first removable member is configured to be disposed in the space of the base.*

*15. The apparatus of claim 14, wherein the second removable member is configured to be disposed in the space of the base.*

*16. The apparatus of claim 13, wherein the first set of angle selections correspond respective distances and a first bullet caliber.*

*17. The apparatus of claim 16, wherein the second set of angle selections correspond to respective distances and a second bullet caliber different than the first bullet caliber.*

*18. The apparatus of claim 17, wherein the apparatus is configured to select a bullet caliber based upon whether the contacting member is in contact with the first removable member or the second removable member.*

*19. The apparatus of claim 13, wherein*

*the base is configured to couple to an optical sight, and*

*the contacting member is configured to select an angle between the optical sight and a barrel axis of the firearm by contacting one of the first plurality of surface areas of the first removable member or one of the second plurality of surface areas of the second removable member.*

*20. The apparatus according to claim 13, wherein the supporter includes a space defined therein, and the first removable member is configured to be disposed in space of the supporter.*

*21. The apparatus of claim 20, wherein the second removable member is configured to be disposed in the space of the supporter.*

*22. The apparatus according to claim 20, wherein base includes the contacting member.*

*23. The apparatus according to claim 13, wherein the first removable member includes a stopper configured to limit a rotary angle of the first removable member.*

*24. The apparatus according to claim 23, wherein the stopper includes a protrusion of the first removable member.*

*25. The apparatus of claim 23, wherein the protrusion is disposed at an end of the first removable member.*

* * * * *